United States Patent
Fries et al.

(10) Patent No.: US 10,464,566 B2
(45) Date of Patent: Nov. 5, 2019

(54) VEHICLE POWERTRAIN AND A METHOD FOR GEAR UPSHIFTING

(71) Applicant: VOLVO TRUCK CORPORATION, Göteborg (SE)

(72) Inventors: Johan Fries, Gråbo (SE); Henrik Ryberg, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/749,577

(22) PCT Filed: Sep. 16, 2015

(86) PCT No.: PCT/EP2015/071243
§ 371 (c)(1),
(2) Date: Feb. 1, 2018

(87) PCT Pub. No.: WO2017/045711
PCT Pub. Date: Mar. 23, 2017

(65) Prior Publication Data
US 2018/0215390 A1    Aug. 2, 2018

(51) Int. Cl.
*B60W 30/19*    (2012.01)
*F16H 61/21*    (2006.01)
(Continued)

(52) U.S. Cl.
CPC ......... *B60W 30/19* (2013.01); *F16H 61/0403* (2013.01); *F16H 61/21* (2013.01);
(Continued)

(58) Field of Classification Search
None
See application file for complete search history.

(56) References Cited

U.S. PATENT DOCUMENTS

| | | | | |
|---|---|---|---|---|
| 4,361,060 A | * | 11/1982 | Smyth | B60W 10/02 477/120 |
| 5,014,573 A | * | 5/1991 | Hunter | F16H 61/061 477/154 |

(Continued)

FOREIGN PATENT DOCUMENTS

| | | |
|---|---|---|
| DE | 10332688 A1 | 2/2005 |
| EP | 1508468 A2 | 2/2006 |

(Continued)

OTHER PUBLICATIONS

International Search Report (dated Jun. 16, 2016) for corresponding International App. PCT/EP2015/071243.

*Primary Examiner* — Colby M Hansen
(74) *Attorney, Agent, or Firm* — WRB-IP LLP

(57) ABSTRACT

A vehicle powertrain includes a propulsion unit having a propulsion unit auxiliary brake, a transmission, driven wheels and a control unit arranged to control at least the transmission, where the propulsion unit is drivingly connected to the driven wheels via a clutch and different engagable gear ratios in the transmission. The control unit is arranged to perform the following steps when upshifting:
automatically disengage the clutch in order to disengage the propulsion unit from the transmission;
upshift the transmission to a new gear compared to current gear;
initiate a synchronization in order to decrease and synchronize rotational speed of the propulsion unit to rotational speed of the new gear to be engaged;
if it is determined by the control unit that the synchronization cannot be performed by decreasing rotational speed of the propulsion unit by the control unit controlling the auxiliary brake to brake the rotational speed of the propulsion unit then, (Continued)

automatically initiate a reengagement of the clutch in order to perform the synchronization.

A corresponding method, a computer program, a computer readable medium, and a control unit for controlling the powertrain are also provided.

10 Claims, 2 Drawing Sheets

(51) Int. Cl.
*F16H 63/46* (2006.01)
*F16H 59/78* (2006.01)
*F16H 61/04* (2006.01)
*F16H 61/12* (2010.01)

(52) U.S. Cl.
CPC ............. *F16H 63/46* (2013.01); *F16H 59/78* (2013.01); *F16H 2061/1224* (2013.01); *F16H 2306/54* (2013.01)

(56) References Cited

U.S. PATENT DOCUMENTS

| | | | | |
|---|---|---|---|---|
| 5,411,450 A | * | 5/1995 | Gratton | B60K 17/344 477/124 |
| 5,425,689 A | | 6/1995 | Genise | |
| 5,582,558 A | * | 12/1996 | Palmeri | B60W 10/06 477/109 |
| 6,361,474 B1 | * | 3/2002 | Gleason | F16H 61/061 192/48.609 |
| 2004/0038776 A1 | * | 2/2004 | Kuhstrebe | B60K 6/485 477/77 |
| 2006/0047395 A1 | * | 3/2006 | Ikeya | B60W 10/06 701/51 |
| 2008/0113847 A1 | * | 5/2008 | Groner | B60W 10/02 477/34 |
| 2010/0063695 A1 | | 3/2010 | Sakaue | |

FOREIGN PATENT DOCUMENTS

| | | |
|---|---|---|
| JP | 2858279 B2 | 8/1997 |
| WO | 03097401 A1 | 11/2003 |

* cited by examiner

VEHICLE POWERTRAIN AND A METHOD FOR GEAR UPSHIFTING

BACKGROUND AND SUMMARY

The invention relates to a vehicle powertrain and a method for upshifting a gear in the powertrain. The invention can be applied in heavy-duty vehicles, such as trucks, buses and construction equipment and in light vehicles such as cars. Although the invention will be described with respect to a truck, the invention is not restricted to this particular vehicle, but may also be used in other vehicles such as buses, construction equipment and cars.

In a vehicle powertrain, comprising an automated clutch arranged between a propulsion unit and an automated transmission, during a gear upshift when the clutch has been disengaged the rotational speed of the propulsion unit can be decreased to a rotational speed synchronized with a selected new higher gear with the help of an auxiliary brake, such as an engine compression release brake, exhaust brake or an electric generator drivingly connected to the propulsion unit. A control unit is arranged to control the auxiliary brake to decrease the rotational speed of the propulsion unit to a rotational speed synchronized with the speed of the new higher gear before the clutch can reengaged in order to drivingly connect the propulsion unit to the driven wheels via the new higher gear. When the control unit registers that the rotational speed of the propulsion unit has been synchronized with the rotational speed of the new gear, the control unit is arranged to reengage the clutch and the powertrain can propel the vehicle with the new higher gear engaged. Such a procedure is beneficial since the rotational speed synchronization with the auxiliary brake speeds up the gear shifting process, and the total tin e for upshift can be decreased.

Even though the braking with the propulsion unit auxiliary brake during a gear upshift works well it sometimes occurs that the propulsion unit auxiliary brake cannot be activated for some reason, which results in a much longer gear upshifting time, since the propulsion unit rotational speed has to decrease with the help of propulsion unit internal rotational friction.

It is desirable to provide a method and a system which eliminates the above problems.

It is desirable to provide a powertrain and a method for controlling an upshift in a powertrain equipped with an auxiliary brake and a transmission with clutch and engagable gears.

In this context, the term "auxiliary brake" is used to denote additional means for assisting braking of the vehicle. In vehicles, auxiliary brakes are used in addition to the service brakes and allow for prolonged brake application without requiring assistance from the service brakes. In this way, wear and unnecessary heating of the service brakes can be avoided. When the propulsion unit is an internal combustion engine such auxiliary brake can comprise an exhaust valve, for activating an exhaust brake, engine brake valves, for activating a compression release engine brake, which auxiliary brakes are dependent on engine speed and gear selection. Further, the auxiliary brake can be an electric generator in combination with a propulsion unit being either an internal combustion engine or an electric motor.

According to a first aspect of the invention, a vehicle powertrain is provided comprising a propulsion unit having a propulsion unit auxiliary brake, a transmission, driven wheels and a control unit arranged to control at least the transmission. The propulsion unit is drivingly connected to the driven wheels via a clutch and different engagable gear ratios in the transmission. The control unit is arranged to perform the following steps when upshifting:

automatically, disengage the clutch in order to disengage the propulsion unit from the transmission;

upshift the transmission to a new gear compared to current gear;

initiate a synchronization in order to decrease and synchronize rotational speed of the propulsion unit to rotational speed of the new gear to be engaged;

if it is determined by the control unit that the synchronization cannot be performed by decreasing rotational speed of the propulsion unit by the control unit controlling the auxiliary brake to brake, the rotational speed of the propulsion unit then, automatically initiate a reengagement of the clutch in order to perform the synchronization.

When the automatic transmission is about to be upshifted from a lower gear to a higher gear and the synchronization of the propulsion unit rotational speed with the auxiliary brake is not available, the control unit is arranged to use the clutch for achieving full synchronization of the rotational speed difference between the higher gear and the propulsion unit. In this way the control unit detects when the auxiliary brake is not available and automatically initiates rotational speed synchronization with the clutch instead of waiting for the rotational speed of the propulsion unit to decrease with help of internal friction of the propulsion unit. Another positive effect is that the rotational energy can instead be used to propel the vehicle forward instead of transform it to heat by braking the propulsion unit rotational speed down to the rotational speed of the new higher gear.

According to a first alternative example the vehicle powertrain further comprises a temperature sensor arranged to indicate temperature of the auxiliary brake and where the control unit is arranged to receive temperature information signals from the temperature sensor. The control unit is arranged to register that the synchronization cannot be performed by determining that braking performance from the auxiliary brake is unavailable when receiving temperature information signals from the temperature is below a first predetermined value and/or above a second predetermined value. Thus, according to one alternative if the auxiliary brake is too cold, that is, temperature is below a first predetermined value, then it is decided that the auxiliary brake is outside its operating temperature. According to another alternative if the auxiliary brake is too hot, that is, temperature is above a second predetermined value, then it is also decided that the auxiliary brake is outside its operating temperature. In a further alternative both a first and a second temperature value can be used, which means that a temperature interval is defined where the auxiliary brake is allowed to be operated.

As a further development of the previous example the temperature sensor is arranged to measure ambient temperature and/or temperature of the propulsion unit auxiliary brake and/or temperature of the propulsion unit.

According to a second alternative example the control unit is arranged to register that the synchronization cannot be performed by registering and determining that the auxiliary brake is faulty. Thus, the control unit is arranged to detect a faulty signal from the auxiliary brake. When the faulty signal is detected the control unit is arranged to use the clutch instead for the synchronization of the rotational speed difference.

According to a further alternative example the propulsion unit can be an internal combustion unit and the auxiliary brake can be an engine compression release brake.

In another alternative example of the invention the auxiliary brake is an electric generator and the propulsion unit is one of; an electric motor and an internal combustion unit. Thus, the powertrain can be a fully electric powertrain comprising an electric motor/generator drivingly connected to the driven wheels via a clutch and transmission with engagable gears, or the powertrain can be a hybrid electric powertrain comprising an internal combustion engine and at least an electric generator (preferably combined with an electric motor) where the electric generator can be used as an auxiliary brake and where the internal combustion engine is drivingly connected to the driven wheels via a clutch and engagable gears in the transmission.

According to a second aspect of the invention, a method is provided for gear upshifting in a vehicle powertrain, comprising a propulsion unit having a propulsion unit auxiliary brake, a transmission and driven wheels, where the propulsion unit is drivingly connected to the driven wheels via the clutch and different engagable gear ratios in the transmission. The method comprising the following automatically performed steps when upshifting:
  disengaging the clutch in order to disengage the propulsion unit from the transmission,
  upshifting the transmission to a new gear compared to current gear;
  performing a synchronization by decreasing and synchronizing rotational speed of the propulsion unit to rotational speed of the new gear to be engaged;
  if determining that the synchronization cannot be performed by decreasing rotational speed of the propulsion unit by controlling the auxiliary brake to brake the rotational speed of the propulsion unit then,
  initiating a reengagement of the clutch in order to perform the synchronization.

The advantages are the same as with the corresponding device.

According to a first alternative example the method defines:
  determining that the synchronization cannot be performed by measuring that a temperature is below a first predetermined value and/or above a second predetermined value where the auxiliary brake cannot operate.

According to a further alternative example the method defines:
  determining that the synchronization cannot be performed by determining that the auxiliary brake is faulty.

According to another alternative example the method defines:
  if determining that synchronization can only be performed partially by controlling the auxiliary brake, then automatically performing the synchronization by controlling the auxiliary brake and the reengagement of the clutch in parallel.

According to further aspects of the invention, a computer program, a computer readable medium and a control unit are provided, each being able to perform the steps of the method.

By the term "drivingly connected" typically means that a first component is connected to a second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

Further features of, and advantages with, the present invention will become apparent when studying the appended claims and the following description. The skilled person realize that different features of the present invention may be combined to create embodiments other than those described in the following, without departing frond the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
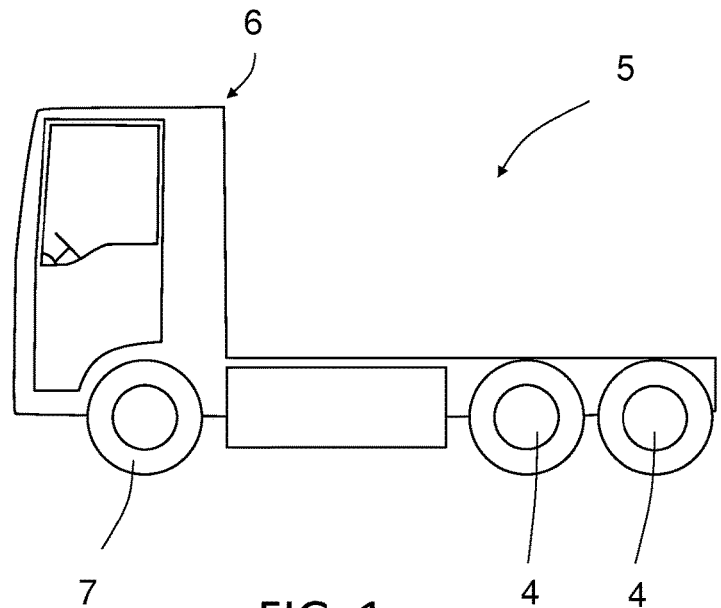
FIG. 1 shows a schematic vehicle provided with a vehicle powertrain according to an embodiment of the invention.

The disclosure concerns a vehicle powertrain and a method for controlling a clutch in a transmission of the vehicle powertrain. With reference to FIG. 1 of the drawings, the clutch may for example be included in a heavy or light truck 5 having a driver's cabin 6, a pair of front wheels 7, two pairs of rear wheels 4 which function as driving wheels.

Figure 2:
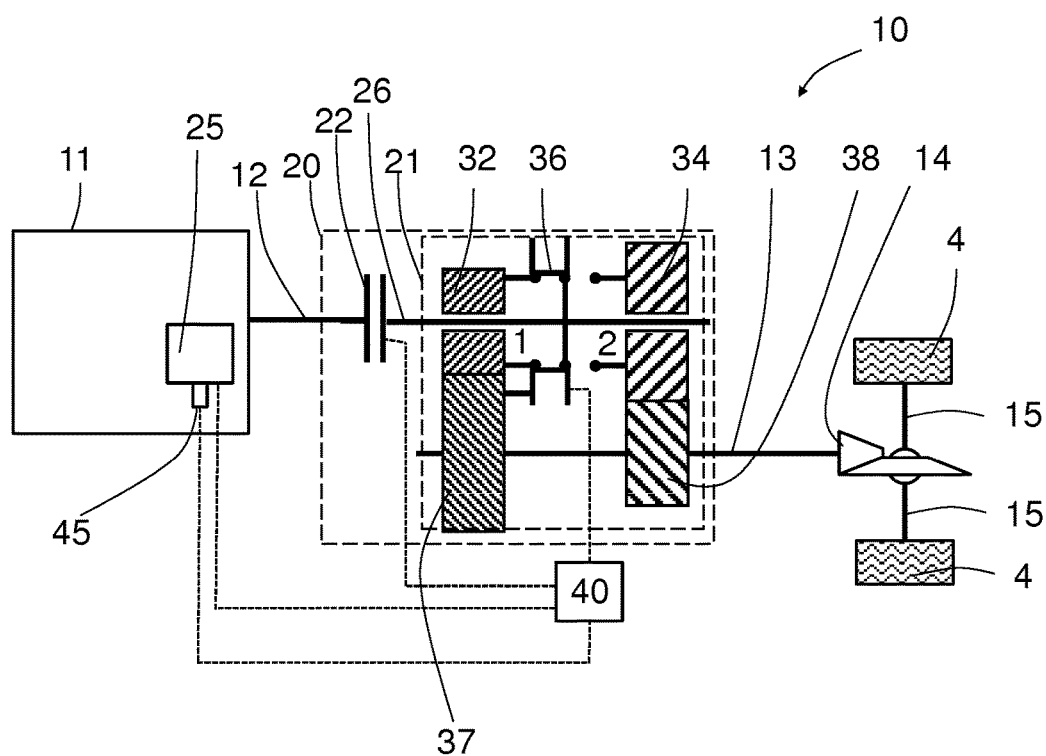
FIG. 2 shows a powertrain according to an embodiment of the invention.

FIG. 2 shows a schematic illustration of a simplified example embodiment of a vehicle powertrain 10 having only two forward gears 1 and 2 for e g the vehicle in FIG. 1. A propulsion unit 11, such as a combustion engine or an electric motor, is connected to a transmission 20 via a propulsion unit output shaft 12. A transmission output shaft 13 of the transmission 20 is drivingly connected to the rear wheels 4 via rear axle differential 14 and two drive shafts 15.

The transmission 20 comprises a friction clutch 22 for transmitting propulsion power via the first or second gear in a gearbox 21. The clutch 22 is controlled by means of an electronic control unit 40 to be engaged or disengaged.

A gearbox input shaft 26 carries a first loose gearwheel 32 and a second loose gearwheel 34, and either the first and second loose gearwheels 32, 34 can be selectively rotationally locked to the gearbox input shaft 26 by means of a tooth clutch 36. The actuating position of the tooth clutch 36 is controlled by a tooth clutch actuating mechanism (not disclosed) that is controlled by the electronic control unit 40. The tooth clutch actuating mechanism as such is known in the art.

The transmission (or gearbox) output shaft 13 carries a first output gearwheel 37 that is rotationally fixed to the transmission output shaft 13 and that meshes with the first loose gearwheel 32. The transmission output shaft 13 further carries a second output gearwheel 38 that is rotationally fixed to the transmission output shaft 13 and that meshes with the second loose gearwheel 34.

An automatic or semi-automatic gear shift is carried out by the electronic control unit 40 controlling the engagement position of the friction clutch 22 and the actuating position of the tooth clutch 36 via the tooth clutch actuating mechanism.

As disclosed in FIG. 2 the propulsion unit is drivingly connected to an auxiliary brake 25 arranged to brake the rotational speed of the propulsion unit 11. Actuation of the auxiliary brake 25 can be controlled by the electronic control unit 40 (as disclosed), or a second control unit (not disclosed) being in communication with the control unit 40.

The embodiment disclosed in FIG. 2 further shows a temperature sensor 45 which can be arranged to measure the temperature of the auxiliary brake 25, or it can be arranged to indirectly measure the temperature of the auxiliary brake by measuring temperature of the propulsion unit. If the auxiliary brake is integrated in the propulsion unit a flood estimation can be achieved of the temperature of the auxiliary brake by measuring the temperature of the propulsion unit 11. For example if the propulsion unit is an internal combustion engine the temperature sensor can be arranged to measure the temperature of a lubricating medium (oil) of the internal combustion engine, and it can be assumed that an auxiliary brake integrated in the propulsion unit has approximately the same temperature as the lubricating medium.

Further the communication line between the auxiliary brake 45 and the control unit 40 can be used to transmit a signal regarding the status of the auxiliary brake. The auxiliary brake can for example send a status signal to the control unit 40 indicating if the auxiliary brake is able to deliver full braking power, part of full braking power (e g half braking power) or no braking power, that is, the auxiliary brake can be for example be faulty or temporary disabled for some reason.

Figure 3:
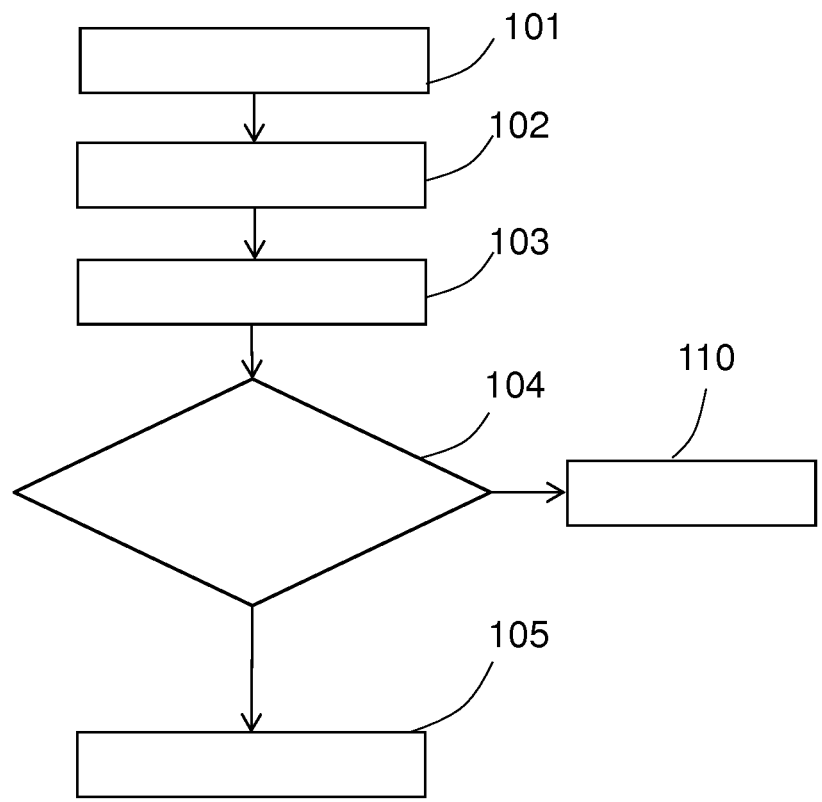
FIG. 3 shows a schematic flow chart for performing the method according to the invention.

According to an embodiment of the invention as disclosed in FIG. 3 the control unit 40 is arranged to perform the following steps when upshifting:

In step 101 the control unit is arranged to automatically disengage the clutch 22 in order to disengage the propulsion unit 11 from the transmission 20;

in step 102 the transmission is upshifted to a new gear (34, 38) compared to current gear (32, 37);

in step 103 a synchronization is initiated in order to decrease and synchronize rotational speed of the propulsion unit to rotational speed of the new gear to be engaged;

In step 104 the control unit determines if the synchronization can or cannot be performed by decreasing rotational speed of the propulsion unit by the control unit controlling the auxiliary brake to brake the rotational speed of the propulsion unit. If determined that the synchronization cannot be performed with the auxiliary brake then next is step 105, and if determined that the synchronization can be performed with the auxiliary brake then next is step 110. In step 110 the synchronization is performed with the auxiliary brake. Step 110 as such is known in the art.

In step 105 reengagement of the clutch in order to achieve the synchronization is automatically initiated. Thus, the synchronization will be achieved by engaging the clutch instead of only using the auxiliary brake.

The decision taken by the control unit in step 104 can be based on received temperature signals from the temperature sensor 45. As mentioned the temperature sensor 45 can be arranged to sense temperature of the auxiliary brake. The control unit 40 is arranged to receive temperature information signals from the temperature sensor, and if receiving temperature information signals from the temperature sensor indicating the temperature is below a first predetermined value and/or above a second predetermined value, then the control unit is arranged to register that the synchronization cannot be performed by the auxiliary brake and step 105 will be selected as next step. The first temperature value is lower compared to the second temperature value. A temperature interval is defined between said first and said second predetermined temperature value, where the auxiliary brake is allowed to operate when both temperature values are used in an embodiment. There can also be embodiments where only one of the first predetermined temperature value and the second predetermined temperature value is used.

The decision taken by the control unit in step 104 can also be based on received signal from the auxiliary brake regarding the status of the auxiliary brake. Thus, if the control unit for example via the communication line between the auxiliary brake 45 and the control unit 40 receives and registers a signal indicating that the auxiliary brake 25 is faulty, then the control unit 40 is arranged to register that the synchronization cannot be performed by the auxiliary brake and step 105 will be selected as next step.

The decision taken by the control unit in step 104 can also be based on received signal from the auxiliary brake indicating that the synchronization can only be performed partially by controlling the auxiliary brake, that is, for example only half of the maximum possible braking capacity for some reason can be available. If this is the case the control unit can be programmed to automatically perform the synchronization by controlling the auxiliary brake and the reengagement of the clutch in parallel.

Thus, depending of embodiment of the invention the decision taken by the control unit in step 104 can be based on one or several of the above mentioned parameters (temperature, status, partial performance).

Figure 4:
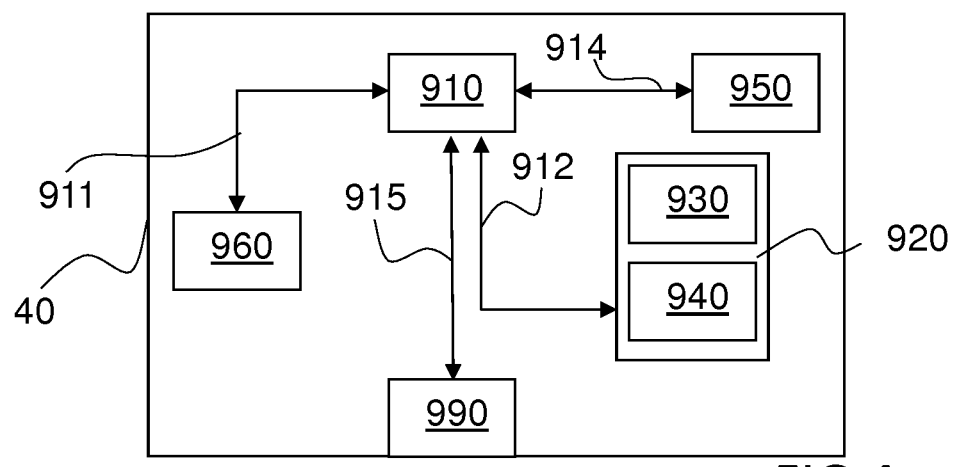
FIG. 4 shows the invention applied on a computer arrangement.

The present invention also relates to a computer program, a computer readable medium carrying a computer program and an electronic control unit 40 for controlling the powertrain 10. FIG. 4 shows an example layout of an electronic control unit 40 comprising a non-volatile memory 920, a data processing unit 910 and a read and write memory 960. The data processing unit 910 may for example be a microprocessor.

The memory 920 may have a first memory part 930 and a second memory part 940. The first memory part 930 may have a computer program for controlling the powertrain 10 stored therein. The computer program in the memory part 930 for controlling the powertrain 10 can be an operating system. The second memory part 940 may have a program for performing the method of the claims stored therein. In an alternative embodiment, the program for performing the method of the claims may be stored in a separate non-volatile storage medium 950 for data, such as, for example, a CD or an exchangeable semiconductor memory. The program can be stored in an executable form or in a compressed state. When it is stated below that the data-processing unit 910 runs a specific function, it should be clear that the data-processing unit 910 is running a specific part of the program stored in the second memory part 940 or a specific part of the program stored in the non-volatile storage medium 950.

The data-processing unit 910 is tailored for communication with the storage medium 950 through a data bus 914. The data-processing unit 910 is also tailored for communication with the memory 920 through a data bus 912. In addition, the data-processing unit 910 is tailored for communication with the read and write memory 960 through a data bus 911. The data-processing unit 910 is also tailored for communication with a data port 990 by the use of a data bus 915. The method according to the present invention can be executed by the data-processing unit 910, by the data-processing unit running the program stored in the memory 940 or the program stored in the non-volatile storage medium 950.

The example schematic layout of an electronic control unit 40 merely represents one single example embodiment of an electronic control unit 40 and a person skilled in the art would understand that many variations in the layout are possible within the scope of the claims.

Reference signs mentioned in the claims should not be seen as limiting the extent of the matter protected by the claims, and their sole function is to make claims easier to understand.

It is to be understood that the present invention is not limited to the embodiments described above and illustrated in the drawings; rather, the skilled person will recognize that many changes and modifications may be made within the scope of the appended claims.

The invention claimed is:

1. A vehicle powertrain comprising a propulsion unit having a propulsion unit auxiliary brake, a transmission, driven wheels and a control unit arranged to control at least the transmission,
   where the propulsion unit is drivingly connected to the driven wheels via a clutch and different engagable gear ratios in the transmission, and where the control unit is arranged to perform the following steps when upshifting:
      automatically disengage the clutch in order to disengage the propulsion unit from the transmission;
      upshift the transmission to a new gear compared to current gear;
      initiate a synchronization in order to decrease and synchronize rotational speed of the propulsion unit to rotational speed of the new gear to be engaged;
   a temperature sensor arranged to indicate temperature of the auxiliary brake and where the control unit is arranged to receive temperature information signals from the temperature sensor, and
   where the control unit is arranged to register that the synchronization cannot be performed by determining that braking performance from the auxiliary brake is unavailable when receiving temperature information signals from the temperature sensor indicating the temperature is below a first predetermined value and/or above a second predetermined value, and where further the control unit is arranged to perform the following steps:
      if it is determined by the control unit that the synchronization cannot be performed by decreasing rotational speed of the propulsion unit by the control unit controlling the auxiliary brake to brake the rotational speed of the propulsion unit then,
      automatically initiate a reengagement of the clutch in order to perform the synchronization,
   wherein the temperature sensor is arranged to measure ambient temperature and/or temperature of the propulsion unit auxiliary brake and/or temperature of the propulsion unit.

2. A vehicle powertrain according to claim 1, wherein the control unit is arranged to register that the synchronization cannot be performed by registering and determining that the auxiliary brake is faulty.

3. A vehicle powertrain according to claim 1, wherein the propulsion unit is an internal combustion unit and the auxiliary brake is an engine compression release brake.

4. A vehicle powertrain according to claim 1, wherein the auxiliary brake is an electric generator and the propulsion unit is one of; an electric motor and an interim combustion unit.

5. A method for gear upshifting in a vehicle powertrain, comprising a propulsion unit having a propulsion unit auxiliary brake, a transmission and driven wheels, where the propulsion unit is drivingly connected to the driven wheels via a clutch and different engagable gear ratios in the transmission, the method comprising the following automatically performed steps when upshifting:
   disengaging the clutch in order to disengage the propulsion unit from the transmission,
   upshifting the transmission to a new gear compared to current gear;
   initiating a synchronization in order to decrease and synchronize rotational speed of the propulsion unit to rotational speed of the new gear to be engaged;
   determining that the synchronization cannot be performed by measuring with a temperature sensor arranged to indicate temperature of the auxiliary brake that a temperature of the auxiliary brake is below a first predetermined value author above a second predetermined value where the auxiliary brake cannot operate, and
   after determining that the synchronization cannot be performed by decreasing rotational speed of the propulsion unit by controlling the auxiliary brake to brake the rotational speed of the propulsion unit then,
   initiating a reengagement of the clutch in order to perform the synchronization,
   measuring, with the temperature sensor, ambient temperature and/or temperature of the propulsion unit auxiliary brake and/or temperature of the propulsion unit.

6. A method according to claim 5, comprising determining that the synchronization cannot be performed by determining that the auxiliary brake is faulty.

7. A method according to claim 5, comprising, after determining that synchronization can only be performed partially by controlling the auxiliary brake, then automatically performing the synchronization by controlling the auxiliary brake and the reengagement of the clutch in parallel.

8. A computer comprising a computer program for performing the steps of claim 5, when the program is run on the computer.

9. A non-transitory computer readable medium carrying a computer program for performing the steps of claim 5 when the program product is run on a computer.

10. A control unit for operating a vehicle powertrain, the control unit being configured to perform the steps of the method according to claim 5.

* * * * *